United States Patent [19]

Gerber

[11] Patent Number: 4,939,188

[45] Date of Patent: Jul. 3, 1990

[54] LITHIUM-CONTAINING RESOLE COMPOSITION FOR MAKING A SHAPED REFRACTORY ARTICLE AND OTHER HARDENED ARTICLES

[75] Inventor: Arthur H. Gerber, Louisville, Ky.

[73] Assignee: Borden, Inc., Ohio

[21] Appl. No.: 288,090

[22] Filed: Dec. 22, 1988

[51] Int. Cl.$^5$ .................. B22C 11/22; C08G 8/08; C08L 61/10; C08K 3/34

[52] U.S. Cl. .................... 523/146; 528/161; 525/508; 524/401; 524/404; 524/413; 524/425; 524/430; 524/431; 524/433; 524/439; 524/441; 524/444; 524/445; 524/594; 524/596; 524/366; 524/379; 524/386

[58] Field of Search ............... 528/161; 525/508; 523/146; 524/594, 596, 379, 386, 366, 401, 439, 433, 430, 413, 404, 444, 425, 450, 431, 445, 441

[56] References Cited

U.S. PATENT DOCUMENTS

| | | | |
|---|---|---|---|
| Re. 32,319 | 12/1986 | Korb et al. | 525/501 |
| Re. 32,720 | 7/1988 | Lemon et al. | 523/145 |
| 2,606,888 | 8/1952 | Williams et al. | 260/59 |
| 2,883,352 | 4/1959 | Sorge et al. | 260/19 |
| 2,985,614 | 5/1961 | Bright | 260/43 |
| 3,333,972 | 8/1967 | Elmer et al. | 106/58 |
| 3,410,718 | 8/1968 | Smith | 117/138.8 |
| 3,599,433 | 8/1971 | Murata et al. | 61/36 |
| 3,629,364 | 12/1971 | Soldatos | 260/838 |
| 3,639,658 | 2/1972 | Soldatos | 260/59 |
| 3,709,849 | 1/1973 | Lemon et al. | 260/29.3 |
| 3,879,338 | 4/1975 | Grazen et al. | 260/38 |
| 3,998,765 | 2/1976 | Novak et al. | 260/2.5 |
| 4,124,667 | 11/1978 | Coppola et al. | 264/29.5 |
| 4,131,476 | 2/1978 | Melcher et al. | 106/38.35 |
| 4,148,777 | 4/1979 | LaBar et al. | 164/43 |
| 4,157,993 | 6/1979 | Funabiki et al. | 164/43 |
| 4,252,700 | 2/1981 | Funabiki et al. | 164/43 |
| 4,283,319 | 8/1981 | Konii et al. | 528/483 |
| 4,313,973 | 2/1982 | McMurty et al. | 427/205 |
| 4,317,896 | 3/1982 | Holik | 525/501 |
| 4,336,179 | 6/1982 | Iyer | 523/145 |
| 4,407,972 | 10/1983 | Brezny | 501/99 |
| 4,419,471 | 2/1983 | Saeki et al. | 524/290 |
| 4,424,300 | 1/1984 | Udvardy et al. | 525/501 |
| 4,426,467 | 1/1984 | Quist et al. | 523/145 |
| 4,426,484 | 1/1984 | Saeki et al. | 524/541 |
| 4,430,441 | 2/1984 | Zhukovsky et al. | 501/109 |
| 4,459,376 | 7/1984 | Matsushima et al. | 523/145 |
| 4,460,717 | 7/1984 | Saeki et al. | 523/145 |
| 4,468,359 | 8/1984 | Lemon et al. | 264/82 |
| 4,468,486 | 8/1984 | Matsushima et al. | 523/146 |
| 4,473,654 | 9/1984 | Stendera | 501/108 |
| 4,474,904 | 10/1984 | Lemon et al. | 523/146 |
| 4,607,067 | 8/1986 | Chashi et al. | 523/144 |
| 4,626,569 | 12/1986 | Waitkus et al. | 524/541 |
| 4,644,022 | 2/1987 | Iyer | 523/144 |
| 4,657,950 | 4/1987 | Iyer et al. | 523/145 |
| 4,703,022 | 10/1987 | Johnson | 501/119 |
| 4,775,455 | 10/1988 | Chandramouli et al. | 204/294 |

FOREIGN PATENT DOCUMENTS

| | | |
|---|---|---|
| 533414 | 11/1956 | Canada . |
| 1065065 | 9/1959 | Fed. Rep. of Germany . |
| 1171606 | 6/1964 | Fed. Rep. of Germany . |
| 53-075294 | 7/1978 | Japan . |
| 55-066947 | 5/1980 | Japan . |
| 55-092247 | 7/1980 | Japan . |
| 56-141938 | 11/1981 | Japan . |
| 57-118074 | 7/1982 | Japan . |
| 62-028041A | 2/1987 | Japan . |
| 62-028043A | 2/1987 | Japan . |
| 1094590 | 12/1987 | United Kingdom . |

OTHER PUBLICATIONS

Japanese Laid-Open Patent Application No. 62-282743, 12/8/87.
EPO Patent Application No. 0 202 004 A2, 11/20/86.
EPO Patent Application No. 0 270 377 A2, 6/8/88.
British Patent Application No. 2 050 400 A, 1/7/81.
British Patent Application No. 2 131 789 A, 6/27/84.
British Patent Application No. 2 140 017 A, 11/21/84.
British Patent Application No. 2 154 593 a, 9/11/85.
British Patent Application No. 2 159 163 A, 11/27/85.
British Patent Application No. 8 322 571, 12/7/83.
Schwarzkopf et al., "Refractory Hard Metals".
U.S. Ser. No. 271,447; Gerber; "Binder Compositions Comprising Low Molecular Weight Poly(orthomethylolated) Phenolic Compound and Novolac Resin", filed 11/15/88.
U.S. Ser. No. 210,726; Chandramouli et al.; "Ambient Temperature Curing, High Carbon Contributing Compositions", filed 6/23/88.

Primary Examiner—Lewis T. Jacobs
Attorney, Agent, or Firm—Dennis H. Rainear; Kenneth P. Van Wyck

[57] ABSTRACT

The invention relates to the use of lithium ion-generating alkalizing agents in resole binder compositions useful for bonding aggregate materials to form refractory articles. Use of lithium-ion generating alkalizing agents produce resole resin binder compositions which, when cured by an ester functional curing agent, exhibit tensile and compression strengths superior to strengths obtained from compositions using sodium ion-generating or potassium ion-generating alkalizing agents.

34 Claims, No Drawings

LITHIUM-CONTAINING RESOLE COMPOSITION FOR MAKING A SHAPED REFRACTORY ARTICLE AND OTHER HARDENED ARTICLES

BACKGROUND OF THE INVENTION:

This invention pertains to a new lithium-containing binder composition suitable for use in bonding a particulate material such as alumina, magnesia, or other aggregate material to make a shaped refractory article.

It is known in the art to employ phenol-formaldehyde resole resins to bond granular refractory material for use in, for example, a foundry molding composition or a refractory article. For example, U.S. Pat. No. 4,426,467 to Quist, et al. discloses such a composition which is curable at room temperature in the presence of an alkali such as sodium or potassium, using a lactone as curing agent. The composition contributes to the dimensional stability of articles produced therefrom via refractory bonding (i.e., through durable carbon-carbon bonds and carbon-aggregate bonds) and also provides abrasion resistance.

It is also known to use a phenol-formaldehyde novolac resin to bond a carbonaceous aggregate as is disclosed in Chandramouli, et al., U.S. Ser. No. 4,775,455, issued Oct. 4, 1988; Chandramouli, et al., U.S. Pat. No. 210,726, filed June 23, 1988; and Gerber U.S. Ser. No. 271447, filed Nov. 15, 1988, titled "Binder Composition Comprising Low Molecular Weight Poly(Orthomethylolated) Phenolic Compound And Novolac Resin" (all assigned to the assignee of the present invention).

Ester curable phenol formaldehyde resole resins are alkaline in nature, i.e., containing potassium or sodium alkali or mixtures thereof. Such resins are disclosed in U.S. Pat. No. 4,474,904 to Lemon, et al. Use of lithium or magnesium salts of lower alkanoic and inorganic acids is known for imparting hot green sand workability in foundry mold applications (see U.S. Pat. No. 4,131,476 to Melcher et al.). Use of lithium ions as the alkalizing agent to facilitate ester cure of resole resins for use in refractory articles is heretofore not demonstrated.

SUMMARY OF THE INVENTION:

Accordingly, the present invention provides a lithium ion-containing binder for refractory articles, which binder cures at room temperature in the presence of an ester functional curing agent. The lithium ion-containing binders of the present invention are also useful for preparing coatings and toppings for various substrates, including but not limited to, concrete. In the absence of an ester-functional curing agent, the binder cures when exposed to elevated temperatures. Refractory articles produced from the binder and an aggregate exhibit higher tensile strengths and higher compressive strengths relative to sodium ion-containing or potassium ion-containing binder systems, after exposure to elevated temperatures.

In one aspect of the invention, a raw batch composition for use in making a shaped article, e.g., a refractory article, is provided. The composition comprises a mixture of (a) an aggregate material; (b) a curable resole resin binder solution wherein the resole is present in sufficient quantity to bond the aggregate into a desired shape; (c) an ester-functional curing agent in an amount sufficient to effect curing of the binder; and (d) a lithium ion-generating alkalizing agent, such as lithium hydroxide, wherein the resole resin has a formaldehyde:phenol ratio in the range of about 1:1 to about 3:1, and wherein the weight ratio of the resole resin to aggregate is from about 2:100 to about 1:7, and wherein the ester-functional curing agent is selected from the group consisting of lactones, cyclic organic carbonates, carboxylic acid esters, and mixtures thereof. The curing agent may be present in the composition at a level of about 3% to 40% based on the weight of the resole resin.

By "phenol formaldehyde resole" herein is meant resole resins, polymers, copolymers, terpolymers or mixtures comprising a phenolic material such as phenol, cresol, or xylenol or mixtures thereof, and formaldehyde.

In another aspect, a shaped article is provided, the shaped article comprising an aggregate material bonded together by a resin binder, the binder comprising a cured phenol formaldehyde resole resin, wherein the resin prior to curing comprises (i) a phenol formaldehyde resole resin having a formaldehyde:phenol mole ratio in the range of about 1:1 to about 3:1, and wherein the resin binder is cured in the presence of sufficient lithium ions to induce cure using a curing agent selected from the group consisting of lactones, cyclic organic carbonates, carboxylic acid esters, aromatic formates and acetates and mixtures thereof.

In a further aspect, the invention relates to a process for making a refractory body that can be sintered to form a carbonized article. The body is prepared from an aggregate material; a resin binder comprising a phenol formaldehyde resole resin or a phenol formaldehyde novolac resin and a phenol formaldehyde resole resin, as specified above; a lithium ion-generating alkalizing agent; and an ester-functional curing agent in an amount sufficient to effect ambient temperature curing of the resin binder. The process comprises the steps of (a) mixing aggregate with resin binder and adding an ester-functional curing agent to coat the aggregate until a binder-aggregate mixture is formed; (b) forming the binder-aggregate mixture into a desired shaped article; (c) optionally allowing the article to stand to develop room temperature strength; and (d) heating the shape to cure and carbonize the resin binder and thereby make a refractory body. It is envisioned that the exact amounts of components used can be varied outside the ranges indicated above, and the ranges are not provided as limitations.

Articles produced using the lithium-ion containing inventive binders display tensile and compression strengths significantly superior to articles produced using potassium ions or sodium ions as the alkali in the binders.

DESCRIPTION OF THE PREFERRED EMBODIMENTS:

It has been found that by using a lithium ion-generating material as the alkalizing agent necessary to promote ester cures of resole resins, improved properties of the resulting cured materials are achieved. The alkalizing agent of the present invention is one capable of providing to the binder composition a lithium ion. Preferred alkalizing agents include lithium oxide, lithium hydroxide, and mixtures thereof. Other sources of lithium ions are also effective in the present invention for catalyzing the cure of the resole resin, such as lithium alkoxides. These can include, for example, the lithium salt of an alcohol containing one to two carbons, such as lithium methoxide, lithium ethoxide, or monolithium salt of ethylene glycol. Materials, mixtures, or compounds containing among other components lithium oxide or lithium hydroxide are also operative herein, as long as the lithium ion level provides to the binder composition sufficient alkalinity to initiate the ester cure of the resole resin at room temperature. The mole ratio of lithium ion to phenol on the resin is for example, from about 0.1:1 to about 0.7:1. A preferred mole ratio is from about 0.3:1 to about 0.6:1.

THE RAW BATCH COMPOSITION

This invention is, in one aspect, a raw batch composition comprising an aggregate material, a resin binder, a lithium ion-generating alkalizing agent, and an ester-functional curing agent. The choices of the aggregate material, and of certain characteristics of the resin binder, are made according to the end product that is desired.

The aggregate material may be any material which may be bound with a resin binder to form a shaped refractory article such as a refractory brick for furnace lining. The aggregate material may be in granular, powder, flake or fibrous form. Suitable aggregate materials for use in refractory applications include, but are not limited to, magnesia, alumina, zirconia, silica, silicon carbide, silicon nitride, boron nitride, bauxite, quartz, corundum, zircon sand, olivine sand, and mixtures thereof. For certain applications, low density aggregate materials such as vermiculite, perlite and pumice are preferred. For other applications, preferable high density aggregates include limestone, quartz, sand, gravel, crushed rock, broken brick and air-cooled blast furnace slag.

One of the constituents of the resin binder of the present invention is a phenol formaldehyde resole resin. A resole resin is the generally alkaline resinous reaction product of a phenolic material and an aldehyde. The phenolic material used herein can be, for example, phenol, cresol, xylenol and mixtures thereof. The resole resin has sufficient residual methylol reactivity such that it may be cured by heat to a water-insoluble and thermally infusible condition, without the addition of a curing agent.

The resole resin useful in the present invention is one having a formaldehyde:phenolic material mole ratio in the range of about 1:1 to about 3:1, and preferably about 1.6:1 to about 2.4:1. The resole resin is generally prepared by reacting the desired proportions of monomers at a pH of greater than about 7.5, and more preferably about 9 to 12. Resole resins useful herein may contain residual $K^+$ or $Na^+$ used in the preparation of the resole.

The weight average molecular weight of the resole can vary over a broad range such as from about 500 to about 2,000, and preferably in the range of about 700 to about 1,500.

The lithium ion-catalyzed resin binder composition of the present invention will customarily, but not necessarily, be an aqueous solution having a solids content of from about 40% to about 75% by weight. It is preferrable to have a composition with a high solids content but if the viscosity is too high, the material becomes difficult to handle and mixing characteristics and performance decline. If the solids level of resin binder in the composition is too low, the viscosity is low and performance suffers due to insufficient binder level.

The lithium ion-generating alkalizing agent in the resin binder composition is present in any amount sufficient to produce a cure of the resole resin when the ester has been added. A preferred level of lithium ion-generating alkalizing agent is an amount sufficient to provide a molar ratio of lithium:phenol moiety on the resole resin in the range of about 0.1:1 to about 0.7:1, although all levels up to a lithium:phenol ratio of about 1:1 are effective.

The ester-functional curing agent used in this invention is one known in the art as having at least one ester-functional group which is capable of catalyzing the cure of the resole resin at ambient conditions.

The ester-functional curing agent may be selected from the group consisting of lactones, cyclic organic carbonates, carboxylic acid esters, aromatic formates, aromatic acetates, and the like, and mixtures thereof. Generally, it is preferred to use a curing agent having from 3 to 12 carbon atoms and more preferably from 4 to 9 carbon atoms. Gaseous esters, such as $C_1$–$C_3$ alkyl formates, are also acceptable curing agents in low density articles or when applying the binders to fabric or paper substrates. When gaseous esters are used as curing agents, the ester is generally not mixed with the resin binder and aggregate but rather is supplied as a gas to the shaped article as taught in U.S. Pat. No. 4,468,359, which is incorporated herein by reference.

Examples of lactones which accelerate the room temperature cure or hardening of the resole resin binders of the present invention include, but are not limited to, gamma-butyrolactone, valerolactone, caprolactone, beta-propiolactone, beta-butyrolactone, beta-isobutyrolactone, beta-isopentylactone, gamma-isopentylactone, delta-pentylactone, and epsilon-caprolactone.

Examples of organic carbonates which accelerate the room temperature cure of the resole resin binder of the present invention include, but are not limited to, 1,2-propylene carbonate, 1,3-propylene carbonate, ethylene carbonate, glycerol carbonate, 1,2-butylene carbonate, 1,3-butylene carbonate, 1,2-pentylene carbonate and 1,3-pentylene carbonate.

Carboxylic acid esters which accelerate the cure of the resole resin binder include, but are not limited to, methyl acetate, ethylene glycol diacetate, glycerol diacetate (diacetin), and glycerol triacetate (triacetin). In the case where a carboxylic acid ester is used, triacetin is preferred.

Other aliphatic monoesters may be suitable, such as formates, propionates, butyrates, and the like. Additional aliphatic multiesters which may be suitable include diformate, diacetate, or higher diesters of ethylene glycol, diethylene glycol, 1,2-propylene glycol, glycerol, 1,3-propanediol, 1,2-butanediol, 1,3-butanediol, and 1,4-butanediol. Furthermore, diesters of dicarboxylic acids, such as dimethyl malonate, dimethyl glutarate, dimethyl adipate, and dimethyl succinate, are suitable.

Lower alkyl formates, gamma-butyrolactone, and propylene carbonate may be used, when rapid mixing, shaping, and curing is desired. Other esters of short and medium chain (e.g., one carbon to six carbons) alkyl monohydric or polyhydric alcohols, and short or medium chain carboxylic acids (e.g., carboxylic acids having one to six carbon atoms) may be used.

Also suitable as ester-functional curing agents in the present invention are aromatic esters such as the formates, acetates, and diacetates of the following: phenol, o-cresol, m-cresol, p-cresol and their mixtures, all isomers of xylenol, m-ethyl phenol, resorcinol, catechol, hydroquinone, pyrogallol, phloroglucinol, chlorophenol, o-hydroxy diphenyl, p-hydroxy diphenyl, diphenylol methane, diphenylol propane, as taught in U.K. Patent Application GB 2140017A.

The ester-functional curing agent preferably is present in an amount sufficient to effect curing of the resole resin binder, typically at about 3% to about 30% by weight, based on the weight of phenolic resin and preferably about 5% to about 25%. A more preferred level of curing agent is 10% to 20%, based on the weight of the resin binder. For use in refractory articles according to the present invention, levels of ester-functional curing agent lower than the levels used for producing foundry articles are preferred, so as to leave unreacted at room temperature a percentage of the methylol sites and to decrease excess ester and its byproducts. These reactive methylol sites are then able to undergo thermal cure upon subsequent exposure of the article to heat. Therefore, it is preferable in the present invention to utilize levels of ester only so high as needed to cure the resole to an acceptable green strength without heat treatment.

It has also been found that, by employing a blend of a novolac component and a resole component, a resin binder may be formulated which is capable of lithium ion-catalyzed room temperature ester cure (chemical cure), followed by subsequent heat treatment (thermal cure). Such resin binders also have the desirable properties of low thermal conductivity and high dimensional stability and abrasion resistance. The ability of articles made from such lithium ion-catalyzed resin binders to withstand extremely high temperatures makes for a binder which is useful for refractory applications.

The lithium ion-catalyzed resin binders of the present invention can utilize a blend of novolac and resole components. By "component" herein is meant an individual resin or a blend, mixture, reaction product, or other combination of resins containing the novolac or resole of reference. A novolac resin is one prepared with a deficiency in aldehyde so that when used alone, it may not be cured unless a curing agent such as hexamethylenetetramine ("hexa") is added. A novolac resin may be defined as the generally acidic resinous reaction product of a phenolic material and an aldehyde that, for practical purposes, does not harden or convert to an insoluble, infusible condition upon heating but remains soluble and fusible. By "novolac" herein is meant novolac resins, polymers, copolymers, terpolymers or mixtures comprising a phenolic material such as phenol, cresol, or xylenol or mixtures thereof, and formaldehyde. Novolac resins are not capable of ambient temperature ester cure (chemical cure). The formaldehyde:phenolic mole ratio of the novolac useful in the present invention is in the range of about 0.5:1 to about 0.9:1, and preferably about 0.6:1 to about 0.8:1, wherein the phenolic material is selected from phenol, o-, m-, and p-cresol, xylenols and mixtures thereof. Preferably, the novolac resin is prepared by condensing formaldehyde and phenol at a pH of less than about 4, and more preferably about 2.

The resin binder may be prepared simply by dissolving or dispersing the resole, or by mixing the prescribed proportions of novolac component and resole component, in alkaline solvent solution. The preferred solvent is water but $C_1$–$C_7$ aliphatic and aromatic alcohols, $C_2$–$C_4$ glycols, glycol ethers, and water-alcohol mixes also are acceptable.

In one embodiment of the present invention, the lithium ion-catalyzed resin binder, prior to cure, is preferably a 0.35:1 to 5:1 by weight mixture of (1) a phenol formaldehyde novolac component having a formaldehyde:phenol mole ratio in the range of about 0.5:1 to about 0.9:1, and (2) a phenol formaldehyde resole component having a formaldehyde:phenol mole ratio in the range of about 1:1 to about 3:1. The weight ratio of novolac to resole in the resin binder is more preferably in the range of about 0.5:1 to about 3:1.

The novolac component used in the alkaline solution may be in the form of, for example, a solution or powder.

Hexa and/or other methylene-generators, such as for example formaldehyde or paraformaldehyde, can be added to the resin binders of the present invention. When used, hexa is added at a level of about 3% to about 15%, based on the weight of total phenolic material, and more preferably at about 5% to about 10%.

The ester-functional curing agent cures the lithium ion-catalyzed resin binders (chemical cure) of the present invention at ambient conditions to thereby provide excellent green strengths. The inventive binders can be further cured or hardened by heat (thermal cure). The heat, if applied, can be heat from an oven or furnace or heat from, for example, molten material poured onto an article prepared from the resin binder and an aggregate. The heat also produces carbonization of the resin binder. Therefore, by "cure" herein is meant both the ester-functional room temperature curing agent acceleration of the cure or hardening of the resin binder, and also the subsequent heat and/or hexa-accelerated cure or hardening of the resin binder.

The aggregate material to be bound by the binder composition may be selected from magnesia, alumina, zirconia, silica, silicon carbide, silicon nitride, zircon sand, olivine sand, boron nitride, bauxite, chromite, corundum, pumice, perlite, vermiculite, limestone, quartz, sand, gravel, crushed rock, broken brick, air cooled blast furnace slag, and mixtures thereof. A particularly preferred aggregate for refractory uses is magnesia (magnesium oxide), which provides particularly good room temperature and post-heating strengths to articles prepared therewith.

The binder composition is generally added to the aggregate material at a weight ratio of resin to aggregate material of from about 3:100 to about 1:7 but preferably is present at about 3 to 10 weight percent.

The lithium ion-generating alkalizing agent can be dissolved or dispersed in the resole resin or a novolac resin, if present. The lithium ion-generating alkalizing agent is generally not soluble in the ester-functional curing agent.

The raw batch composition produced by combining the resin binder, aggregate, curing agent, and lithium ion may additionally comprise any of a number of optional modifiers or additives including non-reactive solvents, silanes, hexa, clays, graphite, iron oxide, carbon pitch, silicon dioxide, metal powders such as aluminum, magnesium, silicon, and calcium and magnesium hydroxides and oxides, and mixtures thereof. In foundry applications and sand-binder overlays, or where silica sand is used as the aggregate, a preferred additive is a silane adhesion promoter, such as gamma-aminopropyl triethoxysilane, which is used in amounts of, for example, up to 0.05% to 0.5% by weight, based on the total resin binder. In refractory applications, clays, metal powders (e.g. aluminum, magnesium or silicon), and graphite are preferred additives. When graphite or metal powders of aluminum, magnesium or silicon or mixtures thereof are used as additives, the amount of aggregate, such as alumina or magnesia, can be reduced to as low as about 70% by weight of the composition. Thus the composition can comprise 70–97% aggregate, 3–25% resin binder, and 0–27% graphite or metal powder additive.

THE SHAPED REFRACTORY ARTICLE

The invention is, in a further aspect, a shaped refractory article comprising an aggregate material bonded together with the aforedescribed lithium ion-catalyzed resin binder.

The aforedescribed lithium ion-catalyzed binder compositions are mixed with the aggregate material and the ester-functional curing agent. Mixing may be accomplished in any means known in the art, i.e., using any industrial mixer such as an Eirich mixer, a Simpson mixer, a Muller mixer, and the like. The binder-aggregate mixture which results from the previous step may be molded by any technique known in the art and subjected to pressure to form a desired shape. For example, the binder-aggregate may be subjected to compression, isostatic pressing, transfer molding, extrusion or injection molding at desired temperatures and pressures.

Following shaping, a low density shape may be subjected to gassing with a gaseous or vaporous ester-functional curing agent and/or a series of heat treatment techniques as known in the art. When gassing the shape with an ester-functional curing agent, it is often not necessary to add a liquid ester-functional curing agent into the binder composition. A typical heat treatment involves a continual increase in temperature up to about 120° C. (248° F.) to 205° C. (400° F.) to effect thermal cure of the resin binder and evaporate off water and organic solvent. Further heat treatment up to 800° C. to 1000° C. further promotes carbonization of the resin binder.

Accordingly, shaped refractory articles which may be prepared include, for example, kiln furniture, hot tops, tundish liners, insulation, ceramic materials, and the like.

In yet other aspects, the invention relates to a process for preparing a shaped refractory article. In one aspect, the invention relates to a process for making a refractory body that can be pyrolyzed or sintered.

In a preferred embodiment of the process of the present invention, the temperature to which the shaped article is heated is in the range of 100° to 150° C.(212° to 302° F.).

In another preferred embodiment of the process of the present invention, the formaldehyde:phenol mole ratio of the resole resin is from about 2:1 to about 3:1, the ester-functional curing agent is triacetin, present at 17% or less based on the weight of the resole resin, the lithium ion-generating alkalizing agent is lithium hydroxide, present in an amount sufficient to produce a lithium:phenol molar ratio of about 0.2:1 to 0.7:1. The preferred aggregate materials are alumina or magnesia, present at levels of from 70% to 97% by weight of the binder-aggregate mixture, depending on whether graphite or metal powder additives are also included.

OVERLAY COATING

The invention is, in another aspect, an overlay coating or topping applied to a rigid surface such as concrete. Thus a room temperature curable flooring composition is provided comprising a resin binder and aggregate system prepared as described above. Aggregates for the overlay coating can be selected from low or high density materials or mixtures thereof. The use of a lithium ion-generating alkalizing agent is preferred to sodium ion-generating or potassium ion-generating alkalizing agents in concrete applications because sodium and potassium ions more readily hydrate to form the hydroxides which are deleterious to the concrete aggregate. The trace amounts of sodium or potassium ions present in the instant compositions from the preparation of the resole resin are not sufficient to produce adverse effects on concrete.

The invention is illustrated by the following Examples which are intended merely for the purpose of illustration and are not to be regarded as limiting the scope of the invention or the manner in which it may be practiced. Unless specifically indicated otherwise, parts and percentages are given by weight.

EXAMPLE 1

Lithium Ion-Containing Resole.

A reactor was charged with phenol (940 grams, 10.0 moles) and 45% potassium hydroxide (62.2 grams, 0.50 mole). To this solution at 60° C. was added over 30 minutes warm 50% aqueous formaldehyde (1074 grams, 17.9 moles) while the reaction temperature rose to 105° C. The reaction mixture was then cooled and held at 75°–85° C. until a Gardner viscosity (25° C.) of T-U (approximately 590 centistokes) was reached. The solution was then rapidly cooled to room temperature. 644 grams of the solution (60.4% solids) was diluted with 88 grams water and 69 grams lithium hydroxide monohydrate was added with mixing. The lithium:phenol and potassium:phenol mole ratios in the resulting resole resin were 0.57:1 and 0.05:1, respectively.

To a 1 gallon Hobart mixer, charged with about 1.25 Kg of magnesia at 25 to 26° C. (75 to 77° F.) was added a 50% aqueous solution of the above lithium ion-catalyzed resole resin to produce a mixture containing 3% phenolic resin solids based on the weight of the magnesia aggregate. The magnesia was of $-14$ to $+48$ mesh size. The binder-aggregate mixture was mixed for 2 minutes followed by the addition to the mixture of 17% triacetin curing agent, based on the weight of the alkaline resole solution (i.e., about 8.5% triacetin based on resole resin solids). Mixing was continued for one minute. A 150 gram sample of the mix was charged to a dogbone die which was then subjected to a ramming pressure of 15 tons for 1 minute to produce a tensile strength test specimen. The specimens, 3 inches long, ⅜ inch thick and 1 inch wide at the neck, were allowed to stand 24 hours at 25° C. and 42% to 48% relative humidity prior to being subjected to breaking on a Tinius Olsen tensile test machine. Some dogbone specimens after the 24 hours at 25° C. were subjected to a 40 hour temperature cycling, which includes 10 hours warming to 98° C., 18 hours at 98° C., and then 12 hours at 177° C. Tensile strengths of these oven-cured samples were also obtained. Compression tests were also performed on the dogbone specimens after the tensile tests. The dogbone pieces were machined to approximately 1.44 inches in length providing a surface area of approximately 1.95 square inches, and a thickness of ⅛ inch. Pounds of pressure to failure were recorded after heating for three hours up to 1000° C. and maintaining 1000° C. firing under nitrogen for one hour. The room temperature tensile strengths after 24 hours at room temperature and after oven curing, and the compressive failure test results are shown in Table I.

In a similar manner, a resole resin binder can be prepared wherein, for example, 15% of the phenol is replaced by a molar equivalent of m-cresol to form a phenol-cresol-formaldehyde resole resin.

EXAMPLE 2

Preparation of Novolac Resin.

The novolac resin utilized in the trials reported in Tables II and IV was prepared as follows.

A reactor was charged with 981 grams (10.44 moles) phenol at 40° C. and 2.0 grams of 93% sulfuric acid and heated to 77° C. Then 467 grams (7.783 moles) of formaldehyde was added over 60 minutes. The reaction mixture was refluxed for 30 minutes and then distilled at atmospheric pressure to a temperature of 110° C. The residue was neutralized with a small amount of lime water slurry and the mixture distilled at atmospheric pressure to 149° C. Vacuum distillation was commenced down to 24 inches Hg. at 149° C. over a 20 minute period. The resulting resin product contained 6% free phenol, exhibited a drop melt point of 248° F. (120° C.) and an initial formaldehyde:phenol mole ratio of 0.746:1.

In a similar manner, phenol-cresol-formaldehyde novolac resins can be prepared by replacing up to about 20 mole per cent of the phenol by a molar equivalent of m-cresol.

In Tables I, II and IV, all mixtures contained 3% phenolic resin solids used as an aqueous, 50% solution. The ester in all cases was triacetin at 17% based on the weight of alkaline phenolic solution. Tensile strength measurements are an average of three samples. Densities of the specimens after 24 hours at room temperature for magnesia and alumina aggregate systems were 2.82±0.02 gms/cc. and after post oven-cure were 2.77±0.02 gms./cc. Corresponding densities for sand aggregate mixtures were 1.78±0.01 gms./cc. room temperature and 1.77±0.01 gms./cc. for post oven-cure. For the sand aggregate systems of Table III, 2.5% by weight phenolic resin solids was used as a 60% solids aqueous solution.

Trial 1 on Table I was a comparative example using a resole resin-aggregate mixture prepared as in Example 1, above, but containing potassium at a potassium:phenol mole ratio of 0.63:1, rather than lithium. Trial 3 was also a comparative example and had a sodium:phenol mole ratio of 0.63:1 rather than lithium. For trial 2, the lithium ion-catalyzed resole resin alkali:phenol ratio included 0.05 potassium and exhibited significantly higher oven-cured tensile strength and compressive strengths than did the sodium or potassium catalyzed resins. Reducing the alkali:phenol mole ratio to 0.34:1 (0.29:1 as lithium trial 4) produced post oven-cure tensile strength exceeding those obtained with significantly more potassium (trial 1) or sodium (trial 3) and no lithium. Trial 5 shows lithium ion catalyzed resole resins prepared as above, but with alkali:phenol mole ratios of 0.19:1 (0.14:1 as lithium). Trial 6 shows that the addition of hexa to a lithium catalyzed resole resin has only a slight effect. These two trials (5 and 6) had low but acceptable 24 hour room temperature cure green strengths (286 and 234 p.s.i.) and significant oven-cured tensile and compressive values. Phenol-cresol-formaldehyde novolac resins will produce equivalent results.

Table II shows a comparison of lithium ion-catalyzed and potassium ion-catalyzed resole resin using alumina as the aggregate material. The alumina was a mixture of three parts of −14 to +28 mesh and one part of −28 to +14 mesh. While the room temperature strengths of trials 7 and 8 are comparable, the lithium ion-catalyzed resole-alumina mixture of trial 8 had a significantly superior tensile strength after oven curing (1055 p.s.i. for lithium ion-catalyzed resole-alumina mixture as compared to 301 p.s.i. for potassium ion-catalyzed resole-alumina mixture). Table II also shows, in comparative trial 9, that use of a novolac resin cured with 10% hexa (based on resin solids) gave unacceptable room temperature strength and only 334 p.s.i. after oven cure.

Table III compares potassium ion- and lithium ion-catalyzed resole-sand mixtures. The sand utilized in the mixtures in Table III was AFS 50 size. While the tensile values are all low due to the absence of silane adhesion promoter usually used in sand mixtures, the post oven-cure tensile strength of the lithium ion-catalyzed resole-sand specimen (trial 11) was significantly higher than the oven-cured tensile strength of the potassium ion-catalyzed resole-sand specimen (trial 10).

Table IV shows tensile strengths after 24 hour room temperature cure and post oven cure strengths for lithium ion-catalyzed resole (trial 13) and resole/novolac (1:1) binders (trial 15), with a magnesia/graphite blend of aggregate material, as compared to potassium ion-catalyzed resole resin (trial 12) and potassium ion-catalyzed 1:1 mix of resole and novolac. A phenol-cresol formaldehyde novolac resin, catalyzed with lithium ion according to the present invention, is expected to provide results comparable to the results in trial 15.

TABLE I

| | Alkali Ion-Catalyzed Resole-Magnesia Mixture | | | |
| --- | --- | --- | --- | --- |
| | | Alkali/ | Tensile, p.s.i. | | Compressive |
| Trial No. | Alkali | phenol | 24 hrs. r.t. | P.O.C. | Lbs. |
| 1 | K+ | 0.63:1 | 769 | 888 | 800 |
| 2 | Li+ | 0.63:1 | 448 | 1682 | 3035 |
| 3 | Na+ | 0.63:1 | 754 | 992 | 2340 |
| 4[a] | Li+ | 0.34:1 | 394 | 1212 | 1710 |
| 5 | Li+ | 0.19:1 | 286 | 1288 | 1960 |
| 6 | Li+ + hexa[b] | 0.19:1 | 234 | 1152 | — |
| 7 | K+ | 0.63:1 | 648 | 760 | 2015 |
| 8 | Li+ | 0.63:1 | 455 | 1506 | 2680 |

The resole resin and binder/aggregate used were prepared as in Example 1.
P.O.C., "post oven-cure" herein, includes a heat history of 98° C. for 18 hours and 12 hours at 177° C., cooling the test specimen to ambient conditions for measurement.
Compressive values (median of 3) were measured at room temperature as pounds of compression until failure of the specimen after 1000° C. firing in a muffle furnace under nitrogen (prepurified, oxygen content less than 20 ppm) for one hour, after 3 to 3½ hour warming cycle. Trials 1 and 2 above were not done with pre-purified nitrogen (oxygen content was up to 200 ppm).
The alkali/phenol molar ratios above include 0.05 as K+ which is residual ion from the resin preparation.
[a]Equivalent results were obtained from resin mixture containing 0.4% N-(2-aminoethyl)-gamma aminopropyl trimethoxysilane, Z6020 from Dow Corning Corporation or 0.4% gamma-aminopropyl triethoxysilane, A1102 from Union Carbide Corporation.
[b]The hexa was present at a level of 5% by weight based on the weight of resole resin solids.

TABLE II

Resole-Alumina Aggregate Mixture

| Trial No. | Resin | Alkali | Alkali/Phenol | Tensile (p.s.i.) 24 hrs. r.t. | P.O.C. | Compressive* lbs. |
|---|---|---|---|---|---|---|
| 7 | Resole | K+ | 0.63:1 | 608 | 301 | 38 |
| 8 | Resole | Li+ | 0.63:1 | 457 | 1055 | 293 |
| 9 | novolac + hexa | — | — | 0 | 334 | 133 |

*Firing conducted with industrial grade nitrogen and not prepurified grade. The resole resin was prepared as in Example 1. The novolac was prepared as in Example 2. The hexa was present in trial 9 at a level of 5% by weight based on the weight of novolac solids.

TABLE III

Resole-Sand Mixture

| Trial No. | Resin | Alkali | Alkali/Phenol | Tensile (p.s.i.) 24 hrs. r.t. | P.O.C. |
|---|---|---|---|---|---|
| 10 | Resole | K+ | 0.63:1 | 49 | 69 |
| 11 | Resole | Li+ | 0 63:1 | 39 | 189 |

The resole resin was prepared as in Example 1, above. The resin binder was used at 2.5% phenolic solids based on weight of the sand.

TABLE IV

Magnesia/Graphite (90/10) Aggregate

| Trial No. | Resin Mix | Alkali/Phenol | Room Temp. Tensile Str. p.s.i. 24 Hrs. | After P.O.C. |
|---|---|---|---|---|
| 12 | Resole (K+) | 0.63:1 | 602 | 863 |
| 13 | Resole (Li+) | 0.63:1 | 454 | 985 |
| 14 | Resole/novolac 1:1 (K+) | 0.57:1 | 684 | 1501 |
| 15 | Resole/novolac 1:1 (Li+) | 0.57:1 | 597 | 1620 |

All with 17% triacetin on liquid resin weight. The resole was prepared as in Example 1, above. The novolac resin was prepared as in Example 2, above. The resin binder was used at 3% by weight in the binder/aggregate mixture. The resole/novolac ratios in trials 14 and 15 are by weight.

That which is claimed is:

1. A curable binder composition comprising
   (a) a phenol formaldehyde resole resin;
   (b) an ester-functional curing agent in an amount sufficient to effect the ambient temperature cure of the resole resin; and,
   (c) a lithium ion-generating alkalizing agent present in an amount sufficient to produce in the composition a mole ratio of lithium:phenol of from about 0.1:1 to about 1:1.

2. A binder composition as in claim 1 wherein the resole resin is the reaction product of a phenolic material and formaldehyde and wherein the formaldehyde:phenol molar ratio is between about 1:1 and about 3:1.

3. A binder composition as in claim 1 wherein the binder composition further comprises a phenol formaldehyde novolac component having a formaldehyde:phenol mole ratio in the range of about 0.5:1 to about 0.9:1, wherein said novolac and said resole are present in the binder composition in a weight ratio of novolac to resole of from about 5:1 to about 0.35:1.

4. A binder composition as in claim 1 further comprising water.

5. A binder composition as in claim 1 further comprising an organic solvent for the resin selected from the group consisting of $C_1$–$C_7$ aliphatic and aromatic alcohols, $C_2$–$C_4$ glycols, glycol ethers, and mixtures thereof.

6. A binder composition as in claim 1 wherein the lithium ion-generating alkalizing agent is selected from the group consisting of lithium oxide, lithium hydroxide, lithium methoxide, lithium ethoxide, monolithium salt of ethylene glycol, and mixtures thereof.

7. A binder-aggregate material comprising (a) a phenol formaldehyde resole resin; (b) an ester-functional curing agent in an amount sufficient to effect the ambient temperature cure of the resole resin; (c) a lithium ion-generating alkalizing agent present in an amount sufficient to produce in the composition a mole ratio of lithium:phenol of from about 0.1:1 to about 1:1; and (d) a particulate aggregate material, wherein the weight ratio of resole resin to aggregate material is from about 2:100 to about 1:7.

8. The binder-aggregate material of claim 7 further comprising a phenol formaldehyde novolac resin.

9. The binder-aggregate material of claim 7 wherein the particulate aggregate material is selected from the group consisting of magnesia, alumina, zirconia, zircon sand, olivine sand, silicon carbide, silicon nitride, boron nitride, silica, bauxite, corundum, pumice, perlite, vermiculite, limestone, quartz, sand, gravel, crushed rock, broken brick, air cooled blast furnace slag, and mixtures thereof.

10. The binder-aggregate material of claim 8 wherein the particulate aggregate material is selected from the group consisting of magnesia, alumina, zirconia, zircon sand, olivine sand, silicon carbide, silicon nitride, boron nitride, silica, bauxite, corundum, pumice, perlite, vermiculite, limestone, quartz, sand, gravel, crushed rock, broken brick, air cooled blast furnace slag, and mixtures thereof.

11. A binder composition as in claim 1 wherein the ester-functional curing agent is selected from the group consisting of lactones, cyclic organic carbonates, carboxylic acid esters, aromatic formates, aromatic acetates and mixtures thereof, and is present in an amount up to about 40% by weight based on the weight of resole resin in the binder composition.

12. A binder-aggregate material as in claim 7 wherein the ester-functional curing agent is selected from the group consisting of lactones, cyclic organic carbonates, carboxylic acid esters, and mixtures thereof, and is present in an amount of from about 5% to about 25% by weight based on the weight of the resole resin in the binder composition.

13. A binder-aggregate material as in claim 8 wherein the ester-functional curing agent is selected from the group consisting of lactones, cyclic organic carbonates, carboxylic acid esters, and mixtures thereof, and is present in an amount of from about 5% to about 25% by weight based on the weight of the resole resin in the binder composition.

14. A binder-aggregate material as in claim 9 wherein the ester-functional curing agent is selected from the group consisting of lactones, cyclic organic carbonates, carboxylic acid esters, and mixtures thereof, and is present in an amount of from about 5% to about 25% by weight based on the weight of the resole resin in the binder composition.

15. A binder-aggregate material as in claim 10 wherein the ester-functional curing agent is selected from the group consisting of lactones, cyclic organic carbonates, carboxylic acid esters, and mixtures thereof, and is present in an amount of from about 5% to about 25% by weight based on the weight of the resole resin in the binder composition.

16. A binder-aggregate material as in claim 9 wherein the ester-functional curing agent is selected from the group consisting of diacetin, triacetin, butyrolactone, caprolactone, methyl formate, ethyl formate, ethylene carbonate, propylene carbonate, dimethyl esters of succinic acid, glutaric acid, and adipic acid and mixtures thereof.

17. A binder aggregate material as in claim 7 further comprising at least one additive selected from the group consisting of non-reactive solvents, silanes, clays, graphite, iron oxide, carbon pitch, silicon dioxide, aluminum powder, magnesium powder, silicon powder, calcium oxide, calcium hydroxide, magnesium oxide, magnesium hydroxide and mixtures thereof.

18. A binder aggregate material as in claim 9 further comprising at least one additive selected from the group consisting of non-reactive solvents, silanes, clays, graphite, iron oxide, carbon pitch, silicon dioxide, aluminum powder, magnesium powder, silicon powder, calcium oxide, calcium hydroxide, magnesium oxide, magnesium hydroxide and mixtures thereof.

19. A binder composition as in claim 1 wherein the lithium ion-generating alkalizing agent is lithium hydroxide.

20. A binder composition as in claim 3 further comprising a methylene generating material selected from the group consisting of formaldehyde, hexamethylene tetramine, and paraformaldehyde.

21. The curable binder composition of claim 1 wherein the phenol formaldehyde resole resin comprises phenol, cresol and formaldehyde.

22. The curable binder compositon of claim 1 wherein the phenol formaldehyde resole resin comprises phenol, xylenol and formaldehyde.

23. The curable binder composition of claim 3 wherein the phenol formaldehyde novolac component comprises phenol, cresol and formaldehyde.

24. The curable binder composition of claim 3 wherein the phenol formaldehyde novolac component comprises phenol, xylenol and formaldehyde.

25. A shaped article for use in making a refractory article comprising aggregate material bonded together by a cured binder composition, said binder composition in its uncured state comprising a phenol formaldehyde resole resin, an ester-functional curing agent, and a lithium ion-generating alkalizing agent selected from the group consisting of lithium oxide, lithium hydroxide, lithium methoxide, lithium ethoxide, monolithium salt of ethylene glycol, and mixtures thereof, wherein the lithium ion-generating alkalizing agent is present in an amount sufficient to produce in the binder composition a mole ratio of lithium:phenol of from about 0.1:1 to about 1:1, and the ester-functional curing agent is present in an amount sufficient to cure at ambient temperature the resole resin and wherein the aggregate material is selected from the group consisting of magnesia, alumina, silica, zirconia, zircon sand, olivine sand, silicon carbide, silicon nitride, boron nitride, bauxite, corundum, pumice, perlite, vermiculite, limestone, quartz, sand, gravel, crushed rock, broken brick, air cooled blast furnace slag, and mixtures thereof.

26. The shaped article of claim 25 further comprising at least one additive selected from the group consisting of non-reactive solvents, silanes, clays, graphite, iron oxide, carbon pitch, silicon dioxide, aluminum powder, magnesium powder, silicon powder, calcium oxide, calcium hydroxide, magnesium oxide, magnesium hydroxide and mixtures thereof.

27. A shaped article as in claim 26 wherein the binder composition further comprises a phenol formaldehyde novolac resin, wherein the weight ratio of novolac resin to resole resin is from about 5:1 to about 0.35:1.

28. A shaped article as in claim 26 comprising a phenol formaldehyde resole resin, an ester-functional curing agent, lithium oxide alkalizing agent and alumina.

29. A shaped article as in claim 26 comprising a phenol formaldehyde resole resin, an ester-functional curing agent, lithium oxide alkalizing agent and magnesia.

30. A shaped article as in claim 27 comprising a phenol formaldehyde resole resin, an ester-functional curing agent, lithium oxide alkalizing agent and alumina.

31. A shaped article as in claim 27 comprising a phenol formaldehyde resole resin, an ester-functional curing agent, lithium oxide alkalizing agent and magnesia.

32. A shaped article comprising
(a) a phenol formaldehyde resin binder composition comprising in its uncured state
  (i) a phenol formaldehyde novolac resin having a formaldehyde:phenol mole ratio in the range of about 0.5:1 to about 0.9:1, and
  (ii) a phenol formaldehyde resole resin having a formaldehyde:phenol mole ratio in the range of about 1:1 to about 3:1,
  wherein said novolac and said resole resins are present in a weight ratio of novolac to resole of between about 5:1 and about 0.35:1 and wherein the phenol is selected from the group consisting of phenol, cresol and xylenol;
(b) an ester-functional curing agent;
(c) lithium oxide alkalizing agent; and
(d) an aggregate material selected from the group consisting of silica, alumina and magnesia present in an amount up to 97% by weight of the shaped article,
and wherein the pH of the resin binder composition is sufficiently alkaline to cure the resin binder composition, at ambient temperature, and bind the aggregate material into a desired shape.

33. The shaped article of claim 32 further comprising at least one additive selected from the group consisting of graphite, aluminum powder, magnesium powder, silicon powder, calcium oxide, calcium hydroxide, magnesium oxide, and magnesium hydroxide, wherein the aggregate is present in the shaped article in an amount from about 70 to about 97% by weight.

34. A shaped article as in claim 32 further comprising a silane adhesion promoter, wherein the aggregate is alumina or silica.

* * * * *